(12) United States Patent
Shimoyama

(10) Patent No.: US 12,093,118 B2
(45) Date of Patent: Sep. 17, 2024

(54) WATCHDOG TIMER DEVICE

(71) Applicant: SANKEN ELECTRIC CO., LTD., Niiza (JP)

(72) Inventor: Naohiko Shimoyama, Niiza (JP)

(73) Assignee: SANKEN ELECTRIC CO., LTD., Niiza (JP)

( * ) Notice: Subject to any disclaimer, the term of this patent is extended or adjusted under 35 U.S.C. 154(b) by 59 days.

(21) Appl. No.: 18/191,298

(22) Filed: Mar. 28, 2023

(65) Prior Publication Data

US 2023/0236914 A1     Jul. 27, 2023

Related U.S. Application Data

(63) Continuation of application No. PCT/JP2021/004482, filed on Feb. 8, 2021.

(51) Int. Cl.
*G06F 11/00*     (2006.01)
*G06F 11/07*     (2006.01)

(52) U.S. Cl.
CPC ...... *G06F 11/0757* (2013.01); *G06F 11/0721* (2013.01); *G06F 11/0793* (2013.01)

(58) Field of Classification Search
CPC ............ G06F 11/0721; G06F 11/0757; G06F 11/0793
See application file for complete search history.

(56) References Cited

U.S. PATENT DOCUMENTS

| 4,912,708 | A | * | 3/1990 | Wendt | G06F 11/0763 |
| | | | | | 714/E11.006 |
| 5,603,047 | A | * | 2/1997 | Caulk, Jr. | G06F 9/3001 |
| | | | | | 712/E9.071 |
| 6,145,103 | A | * | 11/2000 | Typaldos | G06F 11/3648 |
| | | | | | 714/E11.214 |
| 6,697,973 | B1 | * | 2/2004 | Baumeister, IV | G06F 11/0721 |
| | | | | | 714/45 |
| 2008/0263379 | A1 | * | 10/2008 | Tuuk | G06F 11/0757 |
| | | | | | 713/375 |

(Continued)

FOREIGN PATENT DOCUMENTS

| JP | H05-233374 A | 9/1993 |
| JP | 2002-251300 A | 9/2002 |

(Continued)

OTHER PUBLICATIONS

The International Search Report of PCT/JP2021/004482 mailed on Apr. 20, 2021.

*Primary Examiner* — Joshua P Lottich
(74) *Attorney, Agent, or Firm* — METROLEX IP LAW GROUP, PLLC; Robert L. Scott, Esq.

(57) ABSTRACT

A watchdog timer device according to one or more embodiments may include a mode setting unit that sets a first mode or a second mode. In the first mode, the watchdog timer device monitors an operation state of a monitored device and generates an interrupt signal to cause the monitored device to perform recovery processing at a first timeout. In the second mode, the watchdog timer device monitors the recovery processing and generates a reset signal to restart the monitored device at a second timeout. The watchdog timer device uses different logic to execute determining the first timeout in the first mode and determining the second timeout in the second mode.

6 Claims, 4 Drawing Sheets

(56) References Cited

U.S. PATENT DOCUMENTS

| | | | | |
|---|---|---|---|---|
| 2013/0262918 A1* | 10/2013 | Nation | ............ | G06F 11/079 |
| | | | | 714/48 |
| 2015/0106662 A1* | 4/2015 | Atri | ............ | G06F 11/0757 |
| | | | | 714/45 |
| 2016/0087560 A1* | 3/2016 | Miller | ............ | H02P 6/085 |
| | | | | 318/400.06 |
| 2016/0253233 A1* | 9/2016 | Curtis | ............ | G06F 11/0757 |
| | | | | 714/55 |
| 2019/0018964 A1* | 1/2019 | Basehore | ............ | G06F 21/74 |
| 2020/0104204 A1* | 4/2020 | Nautiyal | ............ | G06F 13/1663 |

FOREIGN PATENT DOCUMENTS

| | | |
|---|---|---|
| JP | 2005-092430 A | 4/2005 |
| KR | 2006-0061009 A | 6/2006 |

\* cited by examiner

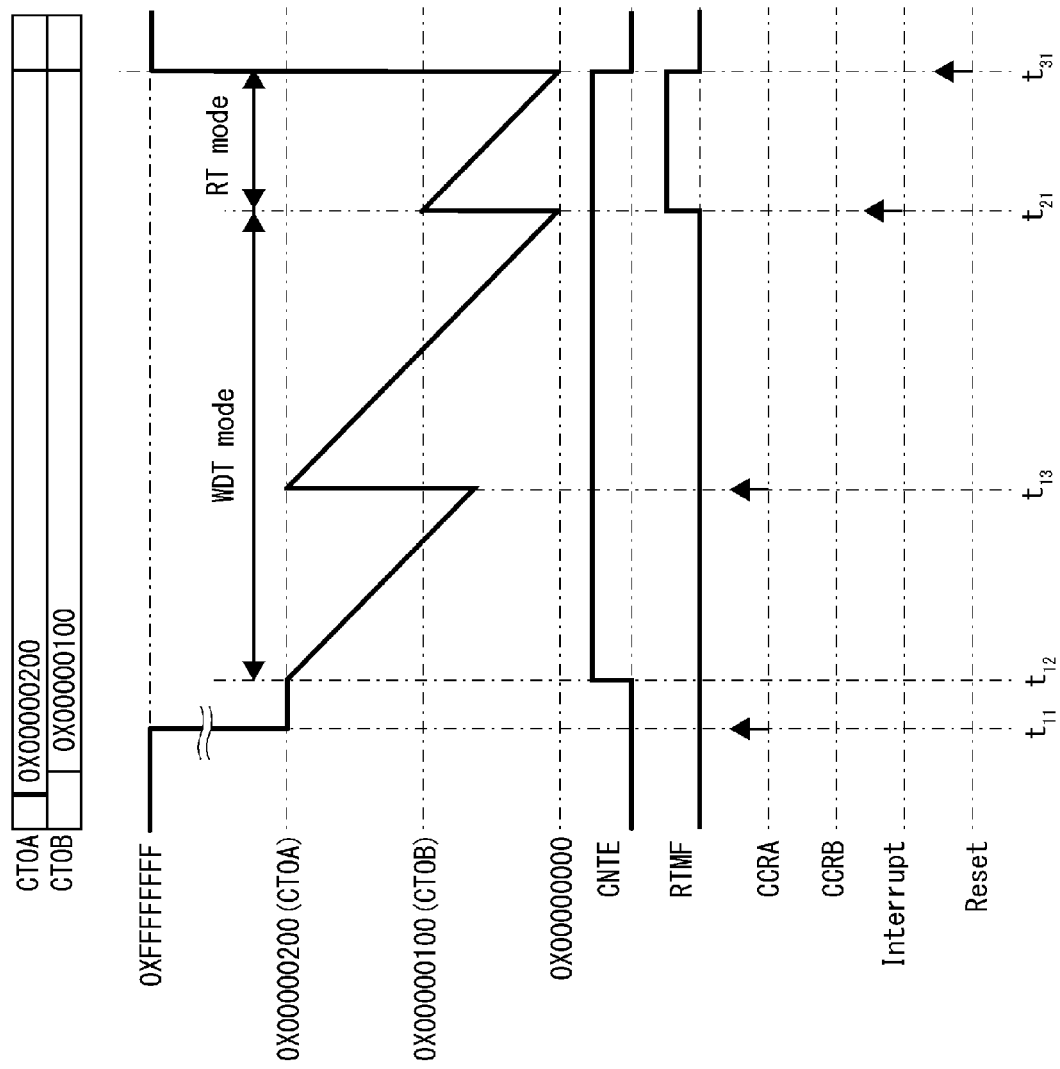

WATCHDOG TIMER DEVICE

CROSS REFERENCE TO RELATED APPLICATIONS

This application claims priority based on 35 USC 119 from prior International Patent Application No. PCT/JP2021/004482 filed on Feb. 8, 2021, the entire contents of which are incorporated herein by reference.

BACKGROUND

The disclosure relates to a watchdog timer device that monitors an abnormality of a monitored device, such as a microcomputer, CPU, etc.

A watchdog timer device is used as an electronic device to monitor an operation state of a monitored device such as a microcomputer, CPU, etc. installed in a system. When a watchdog timer device completes a count of a set timeout time, the watchdog timer device judges that an abnormality occurs in an operation of a monitored device and outputs a reset signal to restart the monitored device. On the other hand, the monitored device, in a normal operation, outputs a clear signal to clear the count of the watchdog timer device before the timeout time elapses. Accordingly, clearing the count may prevent an output of the reset signal from the watchdog timer device to the monitored device.

Korean Patent Publication No. 10-2006-0061009 (Patent Document 1) proposes a watchdog timer device that generates an NMI (Non-maskable interrupt) interrupt at a first timeout and outputs a reset signal at an occurrence of a second timeout. The watchdog timer device sets a flag indicating that an NMI occurs, and an NMI process detects an abnormal state of the processor, such as an infinite software loop caused by a hardware failure or a program error and attempts to remediate the processor failure, such as by generating a reset.

SUMMARY

However, in the related technology, generating an NMI and outputting a reset signal are processes that are executed by the same logic. Accordingly, each process may not be individually optimized.

In other words, the actual processing time for a first timeout time for monitoring an operation state of a monitored device and a time required for analyzing a cause of a runaway of the monitored device may be different from a second timeout time, e.g. a stop/restore processing time. However, in the related technology, the timeout time is set the same for the first time and the second time.

In the related technology, a first count and a second count are cleared by the same clear signal, so when a monitored device continues to operate without processing a first NMI and a clear signal is output without performing recovery processing, a reset does not occur.

A watchdog timer device according to one or more embodiments may individually optimize a process of generating an interrupt and a process of generating a reset.

The watchdog timer device according to one or more embodiments includes a mode setting unit that set a first mode or a second mode. In the first mode, the watchdog timer monitors an operation state of a monitored device and generates an interrupt to instruct the monitored device to perform recovery processing at a timeout, and in the second mode, the watchdog timer device monitors the recovery processing performed by the monitored device and generates a reset to restart the monitored device at a timeout. The watchdog timer device uses different logic to execute the process of determining a timeout in the first mode and the process of determining a timeout in the second mode.

In accordance with the watchdog timer device of one or more embodiments, a process of generating an interrupt and a process of generating a reset may be optimized for monitoring an operation state of a monitored device and for analyzing a cause of a runaway of the monitored device and a recovery processing, such as stop/restore processing, etc., respectively.

BRIEF DESCRIPTION OF DRAWINGS

FIG. 4 is a timing chart illustrating a counting operation of a watchdog timer device, such as is shown in FIG. 1.

DETAILED DESCRIPTION

The following is a detailed description of a watchdog timer device according to one or more embodiments with reference to the figures. In the following embodiments, the same symbols may be applied to configurations that indicate similar functions, and explanations may be omitted where appropriate.

A watchdog timer device 1 (a WDT device 1) according to one or more embodiments is an electronic device that includes a watchdog timer mode (a WDT mode), in which an operation state of a monitored device 10, such as a microcomputer, CPU, etc., is monitored, an interrupt to instruct the monitored device 10 to perform an analysis processing for analyzing a cause of an abnormality such as a runaway is generated, and a recovery processing, such as stop/restore processing, etc., is performed at a timeout. The WDT device 1 may further include a reset timer mode (an RT mode), in which the recovery processing executed by the monitored device 10 may be monitored and a reset to restart the monitored device 10 may be generated at a timeout.

Figure 1:
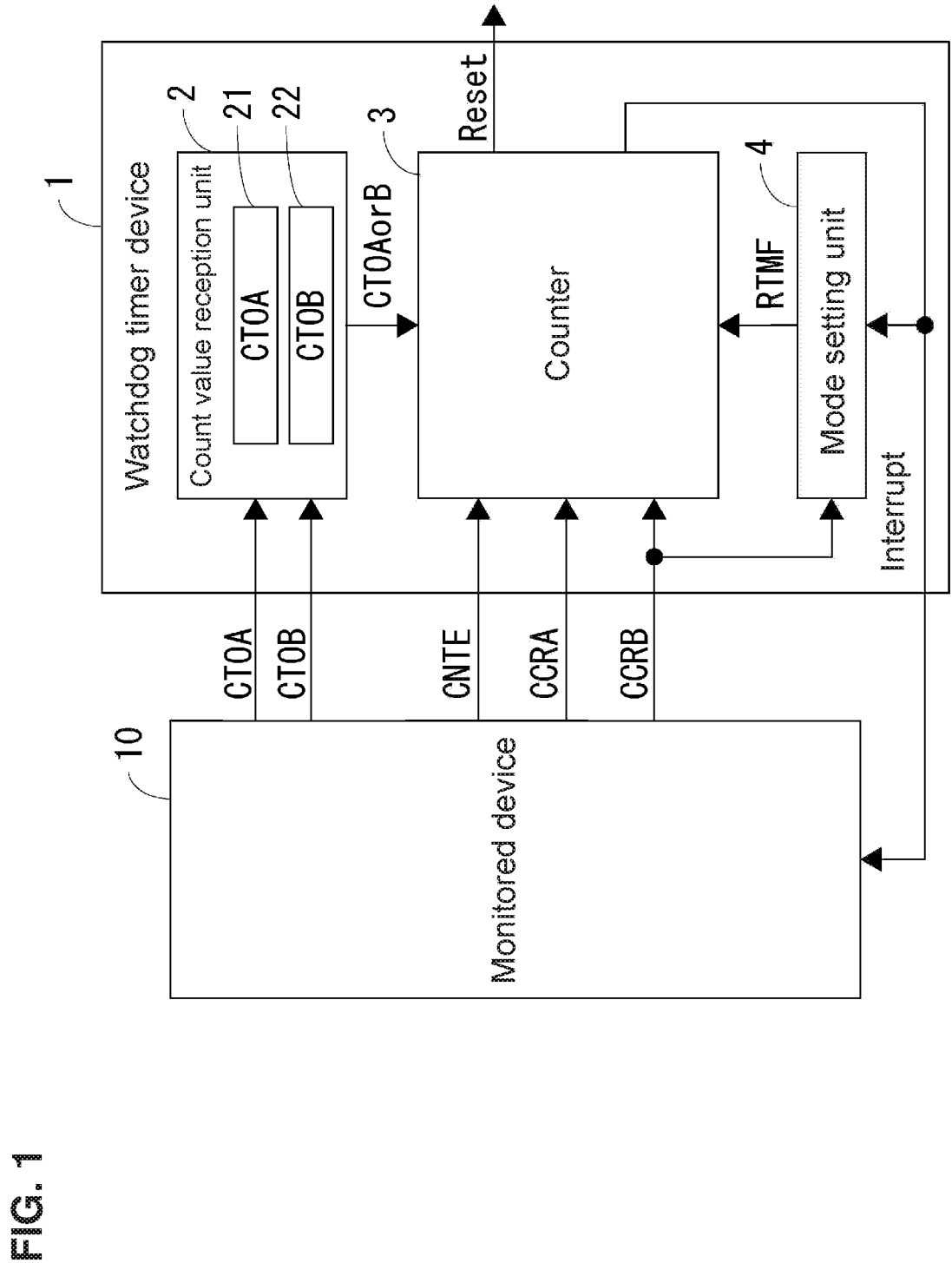
FIG. 1 is a diagram illustrating an example configuration of an embodiment of a watchdog timer device according to one or more embodiments.

Referring to FIG. 1, the WDT device 1 includes a count value reception unit 2, a counter 3, and a mode setting unit 4. The WDT device 1 includes, for example, a semiconductor integrated circuit, in which the count value reception unit 2, the counter 3, and the mode setting unit 4 are integrated in a semiconductor.

The count value reception unit 2 includes a memory circuit, such as a register, etc., and accepts and holds a count timeout count value A (CTOA) as an initial value of a count in the WDT mode and a count timeout count value B (CTOB) as an initial value of a count in the RT mode from the monitored device 10. The CTOA and the CTOB may be accepted from a host device or an external device other than the monitored device 10.

The counter 3 performs a down count from an initial value based on an internal or external clock signal (e.g., divided clock signal) at an assertion (e.g., HIGH) of a count enable (CNTE) from the monitored device 10. The counter 3 judges that a timeout occurs when a count value reaches "0" without a count clear request input from the monitored device 10 during the down count.

In the WDT mode, the counter 3 performs a down count with the CTOA as the initial value, and when the count value reaches "0", the counter 3 judges that a timeout in WDT mode occurs and outputs an interrupt signal (e.g., Interrupt) to instruct the monitored device 10 to perform recovery processing. The interrupt signal, Interrupt, may be output as a NMI (Non-maskable interrupt). Therefore, the CTOA is a value that defines the timeout time in the WDT mode.

In the RT mode, the counter 3 performs a down count with the CTOB as the initial value, and when the count value reaches "0", the counter 3 judges that a timeout in the RT mode occurs and outputs a reset signal (e.g., Reset) to restart the monitored device 10. Therefore, the CTOB is a value that defines the timeout time in the RT mode.

The monitored device 10 performs arithmetic processing according to a predetermined program. In a normal operation, the monitored device 10 periodically outputs a count clear request CCRA to the WDT device 1 at intervals shorter than the timeout time defined in the CTOA. In the WDT mode, when the count clear request CCRA from the monitored device 10 is input during the down count, the counter 3 clears the count value, sets the CTOA to the initial value, and performs the down count. As a result, when the monitored device 10 is operating normally, the WDT device 1 does not generate the interrupt signal, Interrupt, at the timeout in the WDT mode.

When the interrupt signal, Interrupt, is input from the WDT device 1, the monitored device 10 executes the recovery processing, and when the recovery processing is completed, the monitored device 10 outputs a count clear request CCRB. In the RT mode, when the count clear request CCRB is input from the monitored device 10 during the down count, the RT mode is shifted to the WDT mode, and the counter 3 clears the count value and sets the CTOA to the initial value to perform the down count. By setting the timeout time defined by the CTOB to be longer than the time required for the recovery processing by the monitored device 10, when the recovery processing by the monitored device 10 itself is successfully executed, the WDT device 1 does not generate the reset signal, Reset, at the timeout in the RT mode.

The count clear request CCRA and the count clear request CCRB, which are output from the monitored device 10 to the WDT device 1, are defined in different ways. In the WDT mode, the count clear request CCRB is ignored, and in the RT mode, the count clear request CCRA is ignored. For example, when the counter 3 clears a count value by writing a fixed value to a predetermined address, an address to write the fixed value and a fixed value to be written are changed between the count clear request CCRA and the count clear request CCRB. When the counter 3 clears a count value after writing a value calculated from a key value, a calculation formula is changed between the count clear request CCRA and the count clear request CCRB. The counter 3 may ignore the count clear request CCRA when the mode is shifted to the RT mode, a dedicated flag is set, and the dedicated flag is cleared.

The mode setting unit 4 initially sets a mode state to the WDT mode. When the interrupt signal, Interrupt, is output from the counter 3 to the monitored device 10 at setting the WDT mode, the mode setting unit 4 shifts to the RT mode. When the count clear request CCRB is input from the monitored device 10 to the counter 3 at setting the RT mode, the mode setting unit 4 shifts the mode to the WDT mode.

The mode setting unit 4, for example, provides a reset timer flag (RTMF) that may be referenced by the monitored device 10, and sets the RTMF to "0" (Low) in the WDT mode and "1" (High) in the RT mode.

Figure 2:
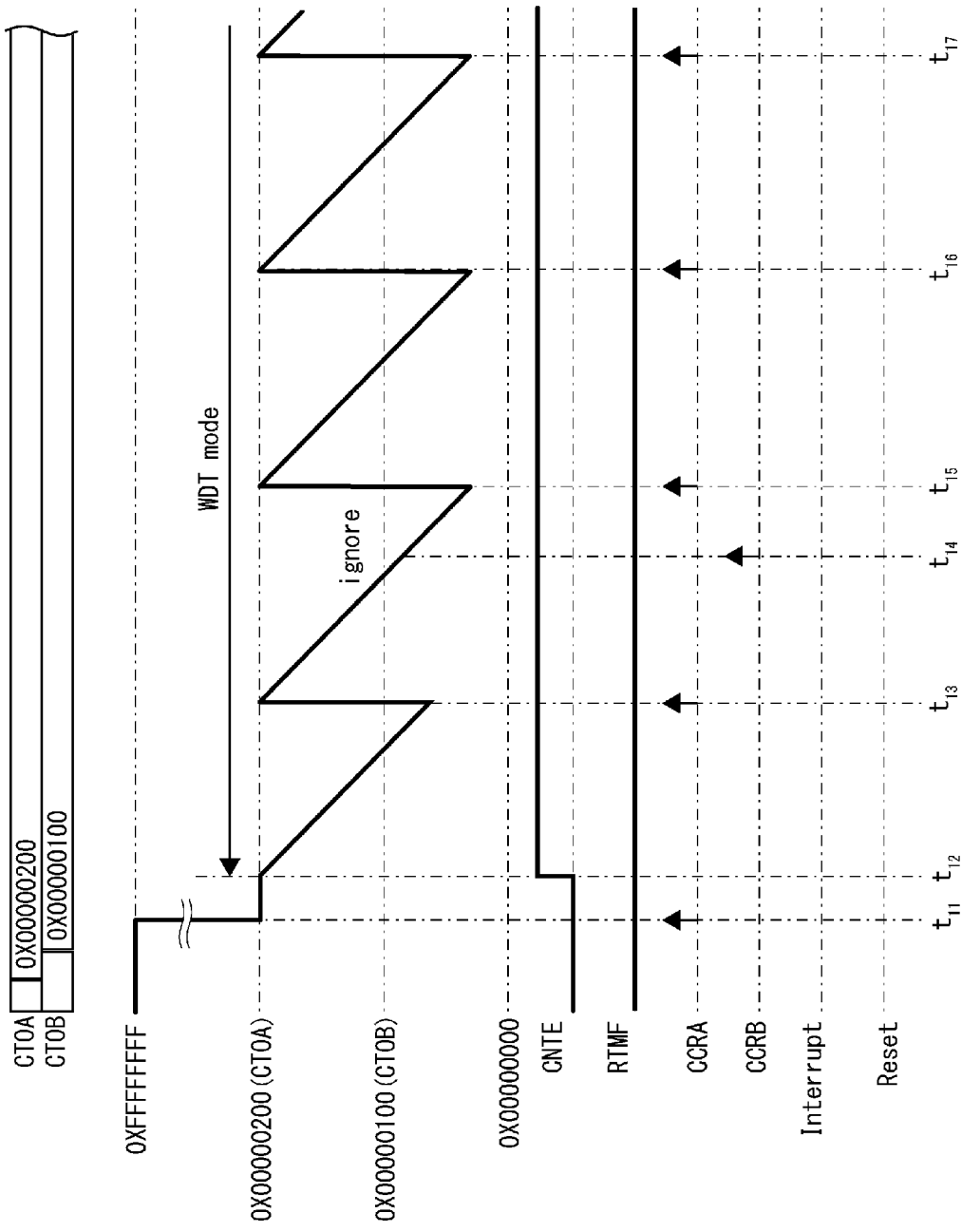
FIG. 2 is a timing chart illustrating a counting operation of a watchdog timer device, such as is shown in FIG. 1.

A counting operation of the WDT device 1 illustrated in FIG. 2 indicates a state in which the monitored device 10 is operating normally.

The count value reception unit 2 of the WDT device 1 accepts and holds a CTOA (0x00000200) to be counted in the WDT mode and a CTOB (0x00000100) to be counted in the RT mode from the monitored device 10 or other external devices, etc. The mode setting unit 4 initially sets the mode state to the WDT mode and sets the RTMF to "0".

When the count clear request CCRA is output from the monitored device 10 to the WDT device 1 at a time $t_{11}$, the counter 3 sets the CTOA (0x00000200) as an initial value to count in the WDT mode. When the monitored device 10 asserts (High) the CNTE at a time $t_{12}$, the counter 3 starts the down count.

The monitored device 10 periodically outputs the count clear request CCRA to the WDT device 1 at intervals shorter than the timeout time defined in the CTOA during the normal operation. Therefore, the count clear request CCRA is input from the monitored device 10 before a count value reaches (0x00000000) (at times $t_{13}$, $t_{15}$, $t_{16}$, $t_{17}$), and the counter 3 clears the count value and sets the CTOA (0x00000200) to the initial value to perform the down count. As a result, when the monitored device 10 is operating normally, the WDT device 1 does not generate the interrupt signal, Interrupt, at the timeout in the WDT mode, and the monitored device 10 continues to operate.

When the count clear request CCRB is output from the monitored device 10 as at a time $t_{14}$, the count clear request CCRB is ignored in the WDT mode and the counter 3 continues the down count.

Figure 3:
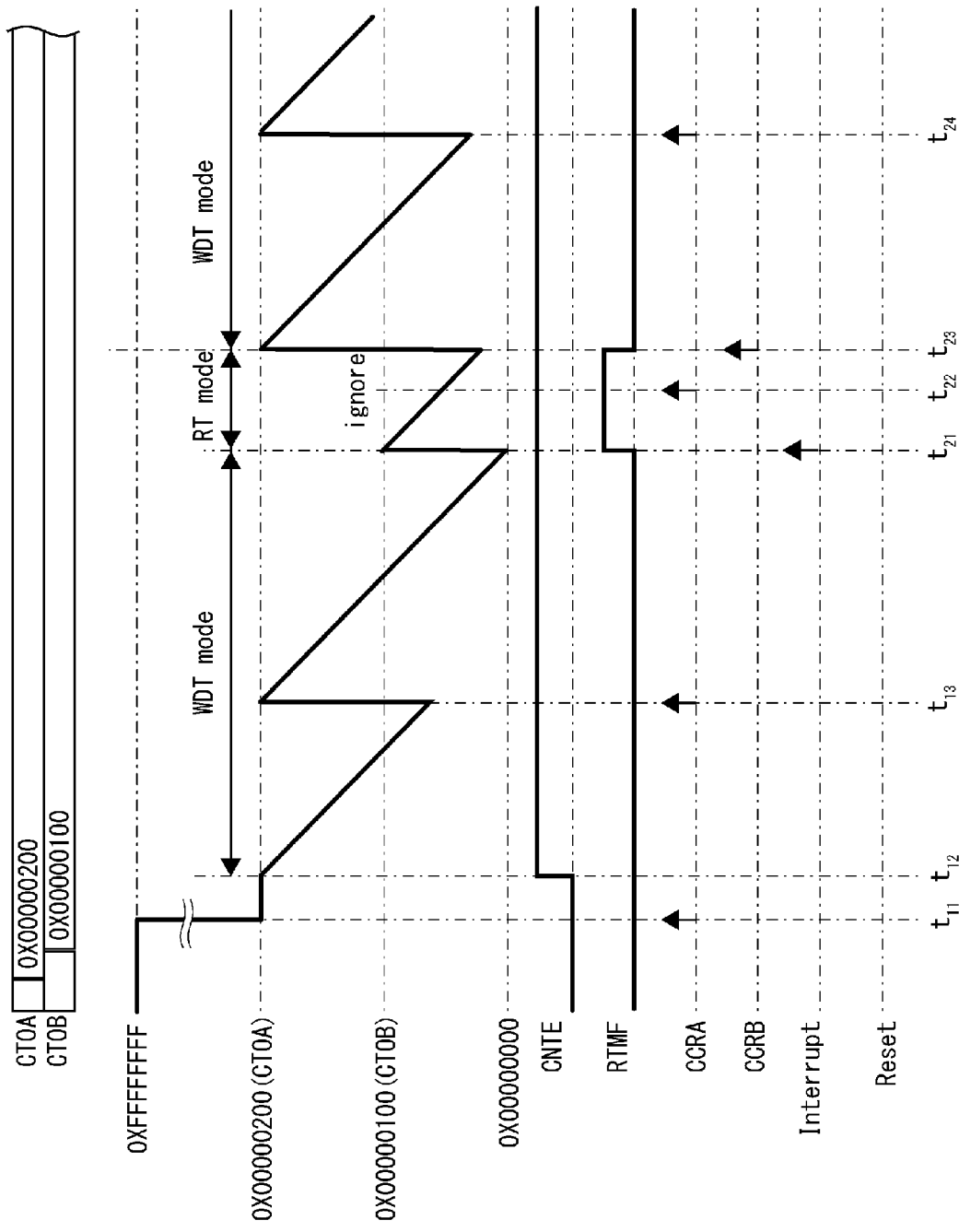
FIG. 3 is a timing chart illustrating a counting operation of a watchdog timer device, such as is shown in FIG. 1.

A counting operation of the WDT device 1 illustrated in FIG. 3 indicates a state in which the interrupt signal, Interrupt, is generated at the timeout in the WDT mode followed by the recovery processing restoring the WDT device 1 to the normal operation. Until the time $t_{13}$, the counting operation of the WDT device 1 is identical to the counting operation of the WDT device 1 illustrated in FIG. 2.

In the WDT mode, when a count value reaches (0x00000000) at a time $t_{21}$ without the count clear request CCRA being input from the monitored device 10 during the down count, the counter 3 judges that the timeout occurs and outputs the interrupt signal, Interrupt, to instruct the monitored device 10 to perform the recovery processing. When the Interrupt is input, the monitored device 10 executes the recovery processing.

The mode setting unit 4 shifts the mode state to the RT mode and sets the RTMF to "1". The counter 3 clears the count value and sets the CTOB (0x00000100) to the initial value to perform the down count. The CTOB is set independently of the CTOA and may be greater than the CTOA.

The monitored device 10 outputs the count clear request CCRB when the recovery processing is completed at a time $t_{23}$. In the RT mode, when the count clear request CCRB is input from the monitored device 10 during the down count, the mode setting unit 4 shifts the mode state to the WDT mode and sets the RTMF to "0", and the counter 3 clears the count value and sets the CTOA (0x00000200) to the initial value to perform the down count.

By setting the timeout time defined in the CTOB longer than the time required for the recovery processing by the monitored device 10, when the recovery processing by the monitored device 10 itself is successfully executed, the WDT device 1 does not generate the reset signal, Reset, at the timeout in the RT mode. When the count clear request CCRA is output from the monitored device 10 as at a time $t_{22}$, the count clear request CCRA is ignored in the RT mode and the counter 3 continues the down count.

Thereafter, the count clear request CCRA is input from the monitored device 10 before the count value reaches (0x00000000) in the WDT mode (times $t_{23}$, $t_{24}$), and the counter 3 clears the count value and sets the CTOA (0x00000200) to the initial value to perform the down count. As a result, when the monitored device 10 is operating normally after the recovery processing, the WDT device 1 does not generate the interrupt signal, Interrupt, at the timeout in the WDT mode, and the monitored device 10 continues to operate.

A counting operation of the WDT device 1 illustrated in FIG. 4 indicates a state in which the interrupt signal, Interrupt, occurs at the timeout in the WDT mode followed by the reset signal, Reset, occurring at the timeout in the RT mode. Until the time $t_{21}$, the counting operation is identical to the counting operation of the WDT device 1 illustrated in FIG. 3.

In the RT mode, when a count value reaches (0x00000000) at a time $t_{31}$ without the count clear request CCRB being input from the monitored device 10 during the down count, the counter 3 judges that the timeout occurs and outputs the reset signal, Reset, to restart the monitored device 10. Therefore, the monitored device 10 is restored by restarting.

As described above, according to the watchdog timer device according to one or more embodiments, the watchdog timer device 1 includes the WDT mode (e.g., first mode) that monitors the operation state of the monitored device 10 and generates the interrupt signal, Interrupt, to instruct the monitored device 10 to perform a recovery processing at a timeout, and the RT mode (e.g., second mode) that monitors the recovery processing performed by the monitored device 10 and generates the reset signal, Reset, to restart the monitored device 10 at a timeout. The watchdog timer device 1 executes the method of determining the timeout in the WDT mode and the method of determining the timeout in the RT mode with different logic. The configuration may allow the method of generating an interrupt and the method of generating a reset to be optimized for monitoring the operation state of the monitored device 10 and for analyzing a cause of an abnormality, such as a runaway of the monitored device 10 and recovery processing, such as a stop/restore processing, etc., respectively.

The watchdog timer device according to one or more embodiments includes the count value reception unit 2 that accepts and holds a CTOA (e.g., first mode count value), which defines a first timeout time in the WDT mode, and a CTOB (e.g., second mode count value), which defines a second timeout time in the RT mode, the counter 3 that judges a timeout when a count value reaches "0", (e.g. when the first timeout time elapses) by the down count with the CTOA as the initial value without the input of the count clear request CCRA (first count clear request) from the monitored device 10 in the WDT mode and judges a timeout when the count value reaches "0" (e.g. when the second timeout time elapses) by the down count with the CTOB as the initial value without the input of the count clear request CCRB (second count clear request) from the monitored device 10 in the RT mode, and the mode setting unit 4 that sets a mode state to the WDT mode in the initial state, shifts the mode to the RT mode by the judgement of a timeout in the WDT mode, and shifts the mode to the WDT mode by the input of the count clear request CCRB in the RT mode. The watchdog timer device according to one or more embodiments may individually optimize the process of generating an interrupt and the process of generating a reset in response to the timeout time to monitor the operation state of the monitored device 10 and the time required for the recovery processing, respectively.

According to the watchdog timer device in one or more embodiments, the count clear request CCRA and the count clear request CCRB are defined in different ways. For example, the count clear request CCRA is ignored in the RT mode. The configuration prevents a reset from occurring in the RT mode when the monitored device 10 continues to operate without accepting an interrupt at the timeout in the WDT mode, and ensures that a reset is generated when the recovery processing fails.

The above-mentioned watchdog timer device according to one or more embodiments is an example and may be modified and implemented without departing from the intended scope of the invention, as defined by the following claims.

The invention claimed is:

1. A watchdog timer device comprising:
a circuit including first logic, second logic, and a mode setting unit that sets a first mode or a second mode, wherein
in the first mode, the watchdog timer device monitors an operation state of a monitored device and generates an interrupt signal to cause the monitored device to perform recovery processing at a first timeout; and in the second mode, the watchdog timer device monitors the recovery processing performed by the monitored device and generates a reset signal to restart the monitored device at a second timeout, and
the first timeout in the first mode is determined using the first logic and the second timeout in the second mode is determined using the second logic.

2. The watchdog timer device according to claim 1, further comprising:
a count value reception unit that accepts and holds a first mode count value, which defines a first timeout time in the first mode, and accepts and holds a second mode count value, which defines a second timeout time in the second mode; and
a counter that judges a timeout when the first timeout time elapses without a first count clear request being input from the monitored device in the first mode and judges a timeout when the second timeout time elapses without a second count clear request being input from the monitored device in the second mode, wherein
the mode setting unit sets a mode to the first mode in an initial state, shifts the mode to the second mode by a judgement of a timeout in the first mode, and shifts the mode to the first mode by an input of the second count clear request in the second mode.

3. The watchdog timer device according to claim 2, wherein
the first count clear request and the second count clear request are defined differently, including that the first count clear request is ignored in the second mode.

4. A watchdog timer device comprising:
a count value reception unit comprising a memory circuit, which receives a first mode count value that defines a first timeout time in a first mode, and a second mode count value that defines a second timeout time in a second mode, from a monitored device that is an external device to the watchdog timer device, and stores the first mode count value and the second mode count value in the memory circuit, wherein, in the first mode, the watchdog timer device generates an interrupt signal to cause the monitored device to perform recovery processing at a first timeout, and, in the second mode, the watchdog timer device monitors the recovery processing performed by the monitored device and generates a reset signal to restart the monitored device at a second timeout;

a counter that performs a down count with the first mode count value as an initial value and outputs the interrupt signal to the monitored device when a count value reaches a predetermined value in the first mode, and performs a down count with the second mode count value as an initial value and outputs the reset signal when a count value reaches a predetermined value in the second mode; and a mode setting unit that outputs a reset timer flag signal to the counter to switch from the first mode to the second mode in response to receipt of the interrupt signal from the counter, and outputs a reset timer flag signal to the counter to switch from the second mode to the first mode in response to receipt of a count clear request signal from the monitored device.

5. The watchdog timer device according to claim 4, wherein the count clear request comprises a first count clear request and a second count clear request, in the first mode, the counter performs a down count with the first mode count value as the initial value and outputs the interrupt signal to the monitored device when a count value reaches a predetermined value without the first count clear request being input from the monitored device, and in the second mode, the counter performs a down count with the second mode count value as the initial value and outputs a reset signal when a count value reaches a predetermined value without the second count clear request being input from the monitored device.

6. The watchdog timer device according to claim 5, wherein the first count clear request and the second count clear request are defined differently, including that the first count clear request is ignored in the second mode.

* * * * *